United States Patent
Buchebner et al.

(12)

(10) Patent No.: US 6,908,871 B2
(45) Date of Patent: Jun. 21, 2005

(54) BATCH COMPOSITION FOR PRODUCING A REFRACTORY CERAMIC SHAPE BODY, SHAPED BODY PRODUCED THEREFROM AND THE USE THEREOF

(75) Inventors: Gerald Buchebner, Leoben (AT); Harald Harmuth, Leoben (AT); Thomas Molinari, Leoben (AT)

(73) Assignee: Veitsch-Radex GmbH & Co., Vienna (AU)

( * ) Notice: Subject to any disclaimer, the term of this patent is extended or adjusted under 35 U.S.C. 154(b) by 277 days.

(21) Appl. No.: 10/220,996

(22) PCT Filed: Mar. 2, 2001

(86) PCT No.: PCT/EP01/02362

§ 371 (c)(1),
(2), (4) Date: Oct. 15, 2002

(87) PCT Pub. No.: WO01/66489

PCT Pub. Date: Sep. 13, 2001

(65) Prior Publication Data

US 2003/0109373 A1 Jun. 12, 2003

(30) Foreign Application Priority Data

Mar. 6, 2000 (DE) .......................... 100 10 918

(51) Int. Cl.$^7$ .............................. C04B 35/03
(52) U.S. Cl. ................. 501/108; 501/121; 501/122
(58) Field of Search ............... 501/108, 121, 501/122

(56) References Cited

U.S. PATENT DOCUMENTS

| 2,026,088 A | * | 12/1935 | Harvey et al. ............... 501/122 |
| 2,160,923 A | * | 6/1939 | Sullivan ...................... 501/122 |
| 3,901,721 A | | 8/1975 | Domain |
| 3,985,842 A | | 10/1976 | Scott |
| 4,175,974 A | * | 11/1979 | Grabner et al. ............. 501/111 |
| 5,646,079 A | * | 7/1997 | Eckstein ...................... 501/100 |

FOREIGN PATENT DOCUMENTS

| DE | 2 139 459 | 3/1972 |
| DE | 25 19 839 | 11/1975 |
| GB | 1098162 | 1/1968 |
| GB | 1 354 934 | 5/1974 |
| GB | 1 569 474 | 7/1976 |
| RO | 92 808 | 10/1987 |

\* cited by examiner

*Primary Examiner*—Elizabeth D. Wood
(74) *Attorney, Agent, or Firm*—Christopher L. Parmelee; Walker & Jocke LPA

(57) ABSTRACT

The invention relates to a batch composition for producing a refractory ceramic shaped body, to a shaped body produced therefrom and to the use thereof. The components used are: 68 to 97 wt.-% molten magnesite, sintered magnesite or mixtures thereof, 3 to 20 wt.-% CaO and 0 to 25 wt.-% of a third component.

10 Claims, 5 Drawing Sheets

(5 of 5 Drawing Sheet(s) Filed in Color)

BATCH COMPOSITION FOR PRODUCING A REFRACTORY CERAMIC SHAPE BODY, SHAPED BODY PRODUCED THEREFROM AND THE USE THEREOF

This invention relates to a batch composition for production of a refractory ceramic moulded body, a moulded body formed therefrom and its use.

Burnt refractory bricks based on magnesite are known, which are designated, including a sintering process of the magnesite, to obtain a substantially volume-stable and temperature-resistant MgO carrier as magnesia and magnesia-chromite products.

Such types, in particular purely magnesitic types, show good wear resistance, but frequently show unsatisfactory infiltration behaviour relative to metallurgic slag, as typical for example in methods for the production of stainless steel. Such methods are known as AOD (=argon-oxygen-decarb methods) or VOD (=vacuum-oxygen-decarburisation methods).

FIG. 1 illustrates a burnt, purely magnesitic brick after an AOD converter slag attack at 1700 to 1750° C.

A relatively small wear zone (here: 7.9 cm$^2$) may be seen, but considerable infiltration of the slag into the brick (over a depth of up to 35 mm).

Apart from these purely magnesitic types burnt (also carbon-bound) bricks are known which contain at least a considerable proportion of dolomite. Depending on whether they comprise exclusively dolomite or predominantly dolomite (apart from magnesia addition), they are described as dolomite or magdol bricks.

FIG. 2 illustrates such a burnt magdol brick comprising 20% magnesia sinter and 80% molten dolomite after a slag test as described with respect to FIG. 1.

The wear of this magdol brick (originally identical in form to abovementioned magnesia brick) is clearly higher when compared to the pure magnesia brick (here: 21.9 cm$^2$) but the magdol brick has a characteristically smaller infiltration zone of only a little more than 1.0 mm.

The following is apparent from FIGS. 1 and 2:

The purely magnesitic brick (FIG. 1) results in considerable slag infiltration. MgO shows, when compared to dolomite, superior corrosion resistance. The deeply infiltrated area of brick results further in considerable brick wear. With a long-lasting temperature effect the bond between the MgO grains in the infiltrated area is dissolved. With fluctuations in temperature the infiltrated zone may separate from the non-infiltrated zone.

With dolomitic bricks (FIG. 2) infiltration is clearly less, but wear is considerably greater (as compared to MgO bricks). This is based on increased corrosion and dissolution of the brick structure. The CaO portions of the dolomite dissolved to a large extent.

One object of the invention is to provide a way to produce a refractory ceramic moulded body, wherein good wear and corrosion properties of purely magnesitic moulded bodies are present as well as the good infiltration resistance of dolomitic moulded bodies.

The knowledge of the invention is that this aim is achieved by a batch composition, whose oxidic composition is oriented extensively to known brick types, but whose raw material selection is altered insofar as CaO is added as a basic component to a magnesitic main component. The CaO component should have a degree of purity of >96% by weight CaO.

In this way CaO can be added "metered" in a defined grain fraction, while at the same time keeping one linked, corrosion-resistant MgO structure in the matrix during use.

Here "metered" means: in particular with respect to the abovementioned applications, in particular the behaviour of the brick relative to metallurgic slag, as to be described hereinbelow. In this way there is no destructive premature dissolution effect of the CaO-rich component by slag components such as $SiO_2$, $CaF_2$, FeO or $Al_2O_3$, as with dolomite or dolomitic bricks, on the structure, because a supporting MgO matrix with good corrosion resistance remains.

Accordingly, in its most general embodiment the invention relates to a batch composition for production of a refractory ceramic moulded body, with the following independent components:

a) 68 to 97% by weight fused (molten) magnesite, sintered magnesite or mixtures thereof with a MgO content >93% by weight and a grain size <8 mm;

b) 3 to 20% by weight CaO in a grain fraction <1 mm, c) 0 to 25% by weight of at least one further refractory component or a component being refractory after firing in a grain size <3 mm.

The invention further relates to an unburnt or burnt moulded body produced on the basis of this patch and a binder. The binder can be e.g. a temporary, C-containing binder, such as paraffin.

FIG. 3 shows a brick thus produced (originally again identical in design to the bricks in FIGS. 1 and 2) after a corresponding slag test, as was performed on bricks according to FIGS. 1 and 2.

It should be acknowledged that wear (here: 7.8 cm$^2$) corresponds to that of the pure magnesia brick (FIG. 1) and the infiltration zone (here: 2 mm) is similarly minimal as in the dolomitic brick according to FIG. 2.

The working mechanism (the behaviour of the brick relative to metallurgic slag) is illustrated by FIGS. 4 and 5.

FIGS. 4 and 5 are etched polished sections of the brick according to the present invention after the slag test.

Those portions designated with (M) and appearing bright in the Figures characterise magnesia (MgO). The pores originally present in between the MgO matrix portions are filled in on the fire side (at the top in the Figures) by a reaction product of in-situ built phases and slag. "Fire side" means the side facing the molten metal/slag.

Following a reaction zone (ca. 0.5 mm from the fire side), which mainly contains monticellite (CMS) and merwinite (C3MS2) as reaction products, the slag has already absorbed so much CaO (C) from the brick that high-melting dicalcium silicate (C2S) was formed, such that the slag has become stiff and can no longer infiltrate. The maximum infiltration depth in FIG. 4 is 1.4 mm.

FIG. 5 shows a section of the 0.5 mm wide reaction zone on the direct fire side. It can be seen that despite reaction with the aggressive, acidic slag a stable MgO structure has remained intact. The arrows in FIG. 5 indicate intact MgO—MgO bonds on the fire side. This effect can be optimised with an increasing MgO content. The same slag-stiffening effect was also observed with basic slags, which have an equally aggressive effect due to $Al_2O_3$ or $CaF_2$ contents.

The aim of the slag-stiffening effect by addition of CaO while keeping to good corrosion resistance of a magnesia brick can also be achieved in connection with slags of the abovementioned type (such as e.g. from AOD converters or VOD ladles) in moulded workpieces of the type claimed, with a CaO content between 5 and 10% by weight. Too much pure CaO (>20% by weight) in the brick structure counteracts the formation of a cohesive, corrosion-resistant MgO structure during firing and increases corrosion.

In dolomite bricks, similar as described above, reaction of the slag within in-situ built brick phases and subsequently stiffening of the slag, is obversed. In dolomite bricks however, due to the substantially higher CaO content and a more homogeneous CaO distribution at the same time, this reaction results in dissolution of the brick phases and thus in accelerated wear (FIG. 2).

Further physical data of the brick according to the present invention (FIGS. 3 to 5) compared to the bricks of FIGS. 1 and 2 are summerized in the following table:

|  | Brick according to the invention (FIGS. 3–5) | Magnesia brick (FIG. 1) | Dolomite brick (FIG. 2) |
| --- | --- | --- | --- |
| Firing temperature (° C.) | 1.650 | 1.720 | 1.550 |
| Apparent density (g/cm$^3$) | 3.01 | 3.01 | 2.94 |
| Open porosity (Vol. %) | 14.3 | 15.0 | 16.0 |
| Cold compression strength (N/mm$^2$) | 76 | 49 | 53 |

The table shows that the brick according to the present invention has favourable porosity values and a high cold compression strength.

All the above data relate to a brick according to the present invention comprising 94% by weight magnesia sinter of the grain fraction <5 mm and 6% by weight CaO in a grain fraction <200 μm.

The MgO content of the magnesitic batch composition component is at least 97% by weight according to one embodiment, and the grain size is below 5 mm according to an alternative.

The CaO component should be as pure as possible and the degree of purity is for example >96%. But it is also possible to utilise a CaO component with less CaO content, such as >70% by weight, whereby the degree of purity should in each case be above 55% by weight. According to the required CaO content the originally weighed-in quantity of this component is to be increased optionally when the batch compound is being prepared, or the portion of the MgO component is to be lowered. According to one embodiment the CaO component in the batch composition is employed in a grain size <200 μm.

Based on the aforementioned effects the invention also comprises the use of a moulded body as mentioned hereinabove for lining a metallurgical melting vessel in particular in its slag zone, in which the amount of the MgO and CaO components is adjusted such that said CaO forms high-melting phases such as C$_2$S with a slag infiltrate in a quantity which fills in the open pores of the moulded body on its fire side near the surface (up to approximately 2 mm).

The associated stiffening effect prevents the infiltrate from penetrating deeply into the moulded body.

The invention also offers a batch of the kind mentioned hereinabove which includes, apart from the basic compound of MgO and CaO basic components, a) and b) at least one further refractory component or a component refractory after burning in a grain size <3 mm (according to an embodiment: <1 mm).

This additional refractory component can for example, comprise at least one of the following refractory oxides or oxidic fused (molten) materials: SrO, TiO$_2$, ZrO$_2$, SiO$_2$, CaO—MgO, SrO—CaO, SrO—ZrO$_2$.

In the presence of particularly high-basic slags, for example of the CaO—SiO$_2$—CaF$_2$ system, the above-mentioned C$_2$S formation can lead to structural destruction (so-called C$_2$S decomposition) due to a change of the dicalcium silicate from the beta to the gamma modification when cooling the corresponding brick lining below 500° C. Batch compounds of the abovementioned type are especially suitable in counteracting this.

A component, refractory after burning, is understood as a component which has no refractory properties as a batch component (as such), but during burning of a product produced from the batch compound, for example a brick, is converted into a refractory component, that is, into a component having a melting point of typically more than 1400° C. For example, strontium oxide as a refractory component with a melting point of ca. 2400° C. originates from strontium carbonate by disintegration at ca. 1200° C. As is evident from the above table, the firing temperature for such products is usually above 1600° C.

Non-oxidic compounds, in particular strontium compounds, are particularly suited in this respect, for example strontium carbonate, strontium sulfate, strontium hydroxide, strontium nitrate, strontium chloride or strontium boride, which can be used separately or in a mixture. During the described firing process the aforementioned non-oxidic strontium compounds modify into highly reactive strontium oxide (SrO). Due to high reactivity this strontium oxide can become "mobile" and move along the temperature profile, for example during use of the brick, starting from the fire side (separate by liquation). Accordingly, it is no longer available as stabilising foreign ion on the direct fire side.

For this reason it is an advantage to already add a strontium component to the batch compound, such as a molten material containing SrO (which was produced—for example—synthetically in an electric arc furnace from SrCO$_3$ by a melting process), which is characterized by a particularly large crystal size in the range of 40 to 300 μm as compared to a strontium oxide formed in-situ during brick burning. Apart from the above-mentioned SrO—CaO molten material a SrO—ZrO$_2$ molten material is especially suited (for example with essentially identical portions of strontium or zirconium oxide), in which the newly developed phases exhibit good hydration resistance.

Addition of the abovementioned strontium compound(s) should be such that the content of strontium oxide in a burnt product is at least 2% by weight, relative to the brick.

With respect to avoiding C$_2$S decomposition and retaining good corrosion resistance similar brick properties are achieved by addition of other refractory oxide components to the basic batch compound. The addition of an MgO—CaO molten material due to the large crystal size (again ca. 40 to 300 μm, compared with about 10 to 15 μm crystal size of naturally occurring dolomitic raw materials) and to the MgO content leads to retaining a cohesive, corrosion-resistant MgO structure in the brick.

BRIEF DESCRIPTION OF DRAWINGS

The patent or application file contains at least one drawing executed in color. Copies of this patent or patent application publication with color drawing(s) will be provided by the office upon request and payment of the necessary fee.

Figure 1:
FIG. 1 illustrates a burnt, purely magnesitic brick after a slag test.
Figure 2:
FIG. 2 illustrates a burnt magdol brick comprising 20% magnesia sinter and 80% molten dolomite after a slag test.
Figure 3:
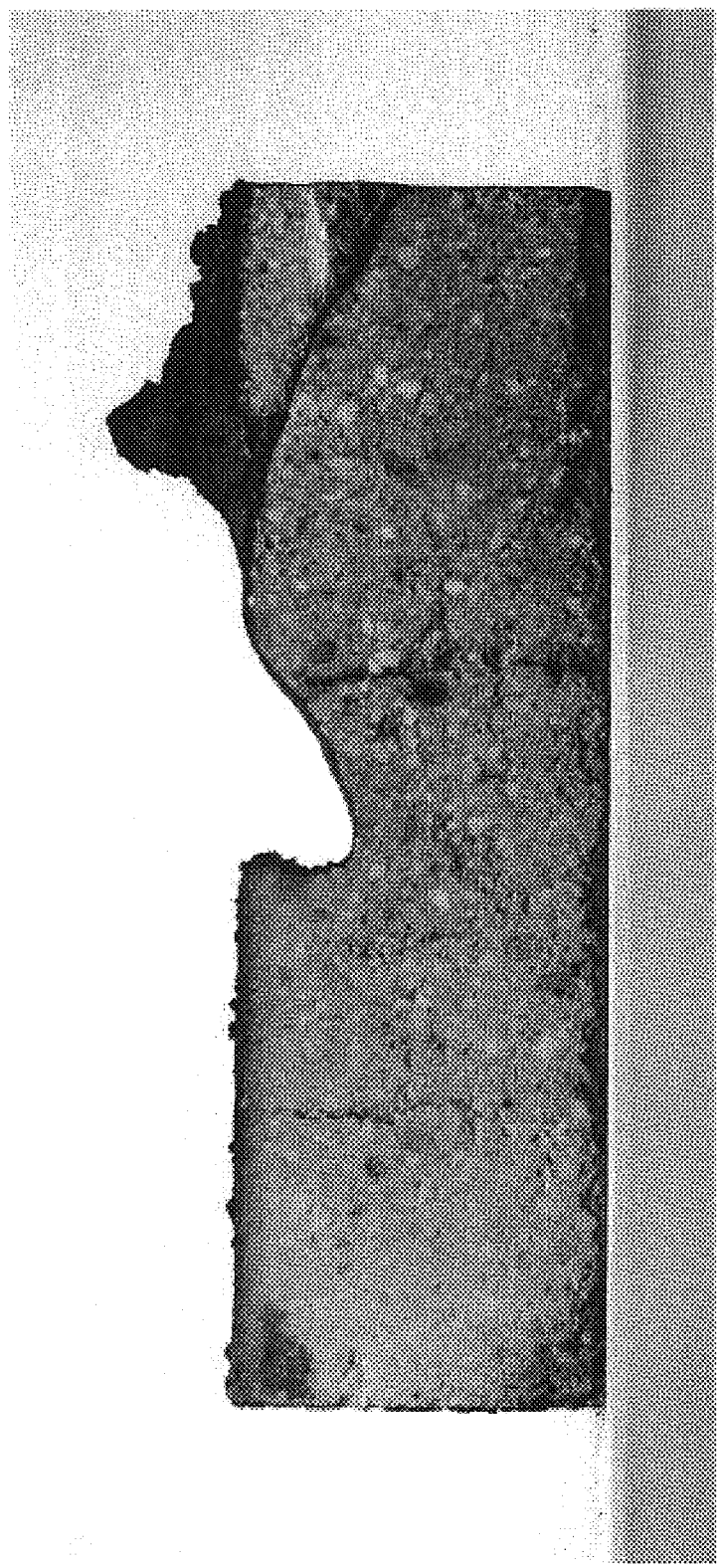
FIG. 3 shows a brick produced according to an embodiment of the invention after a slag test.
Figure 4:
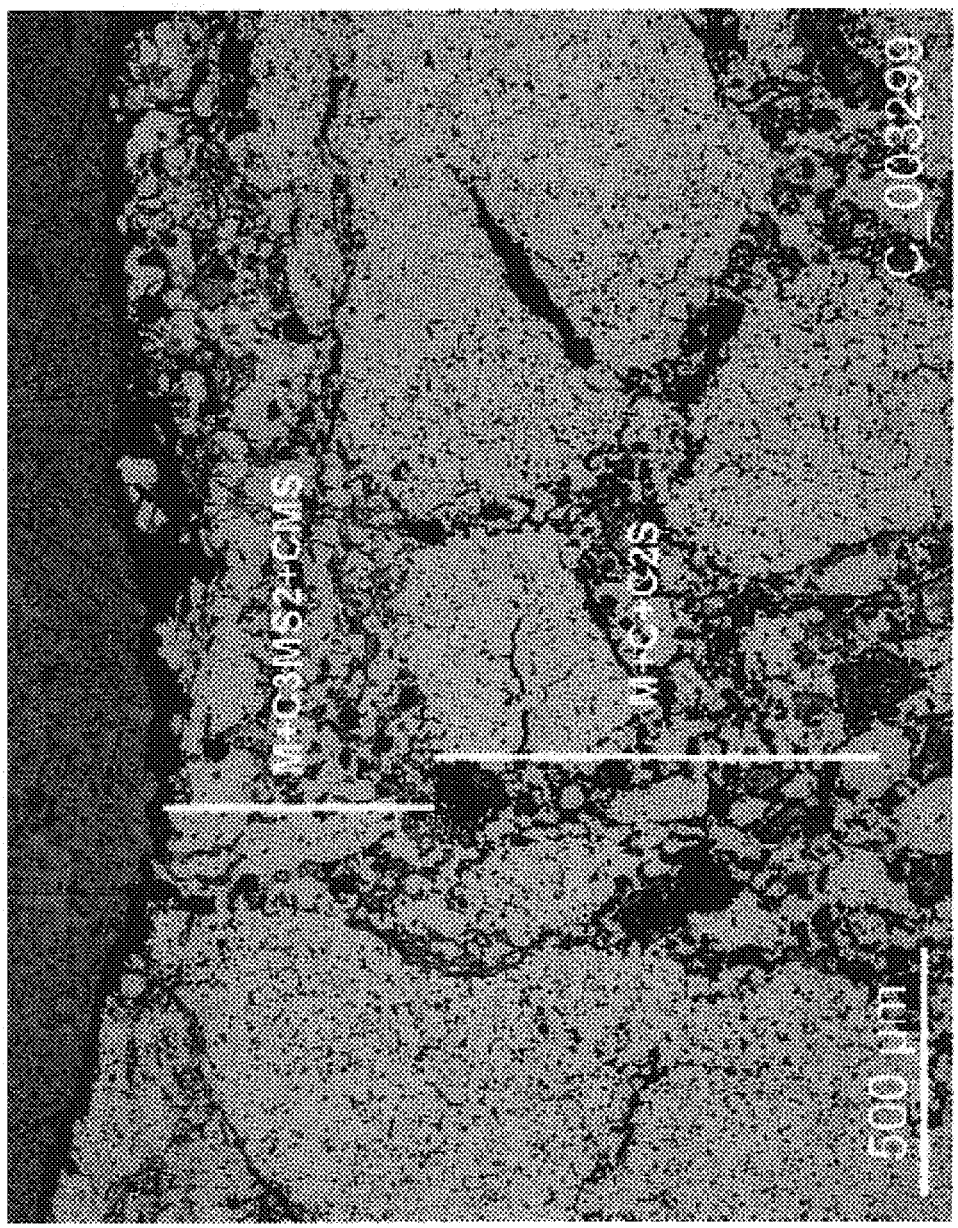
FIGS. 4 and 5 show etched polished sections of a brick produced according to an embodiment of the invention after a slag test.
Figure 5:
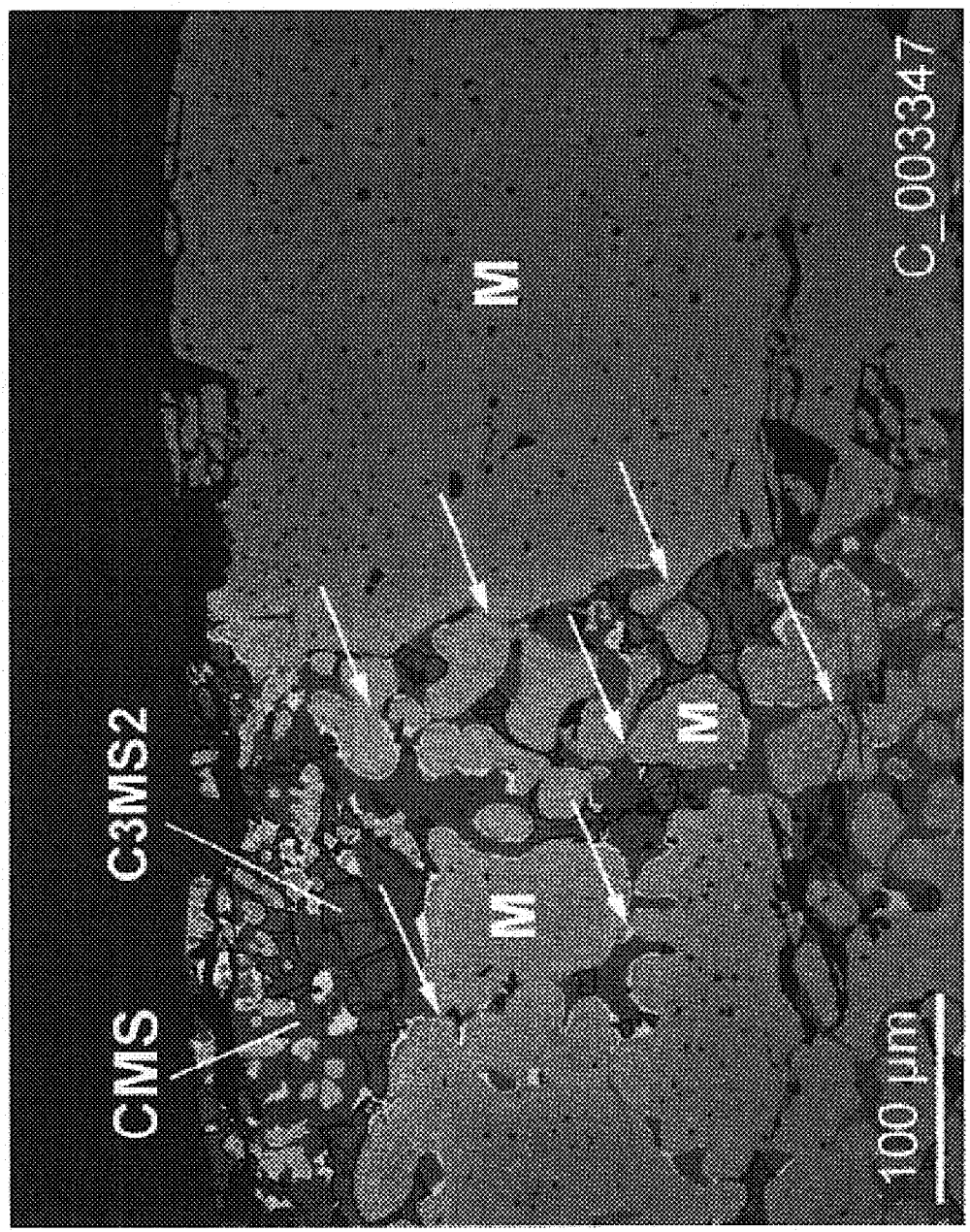

The molten material may contain varying portions of MgO and CaO. One embodiment proposes using a MgO—CaO molten material which has a higher MgO content compared to naturally occurring dolomite raw materials, which is 60% by weight, for instance.

Even in these abovedescribed batch compounds the initially described effects of CaO remain unchanged, to offer a highly reactive reaction partner for infiltrating slags, to thus reduce or stop the slag infiltration into the fire-side area, and to thus prevent destruction of the brick.

The quantity of the added refractory component or component being refractory after burning is according to an embodiment of the range of 15 to 25% by weight, relative to the overall batch compound. The CaO content according to component b) is accordingly limited to 5 to 11% by weight. The content of molten magnesite, sintered magnesite or mixtures thereof according to component a) is for example 68 to 80% by weight (all portions relative to the entire batch compound in each case).

It is understood that all batch composition components must add up to 100% by weight in each case. This does not exclude the addition of smaller quantities of additional batch composition components, with corresponding reduction of the other batch composition components.

Thus the principle of the infiltration-inhibiting effect via (separate) addition of CaO can also be applied to a pitch-bonded or resin bondend (unburnt) MgO-based moulded body. In this case the entire mixture (the batch compound) has for example 2 to 20% by weight carbon, relative to the whole mixture.

What is claimed is:

1. A batch composition for production of a refractory ceramic moulded body comprising the following independent components:
    a) 68 to 97% by weight fused magnesite, sintered magnesite or mixtures thereof with a MgO content >93% by weight and a grain size <8 mm,
    b) 3 to 20% by weight CaO in a grain fraction <1 mm,
    c) 0 to 25% by weight of at least one further refractory component or a component being refractory after firing in a grain size <3 mm.

2. The batch composition as claimed in claim 1, wherein the grain size of the component a) is <5 mm.

3. The batch composition as claimed in claim 1, comprising 5 to 10% by weight of component b).

4. The batch composition as claimed in claim 1, wherein the component c) comprises SrO, $TiO_2$, $ZrO_2$, $SiO_2$, CaO—MgO fused material, SrO—CaO fused material, SrO—$ZrO_2$ fused material, non oxidic strontium compound or mixtures thereof.

5. The batch composition as claimed in claim 4, wherein the non-oxidic strontium compound comprises Sr carbonate, Sr sulphate, Sr hydroxide, Sr nitrate, Sr chloride, Sr boride or mixtures thereof.

6. The batch composition as claimed in claim 1, wherein the MgO content of the component a) is at least 97% by weight.

7. The batch composition as claimed in claim 1, wherein the component a) has a grain fraction <200 μm.

8. The batch composition as claimed in claim 1, wherein the component b) has a purity of at least 96% by weight CaO.

9. The batch composition as claimed in claim 1, wherein the component c) has a grain size <1 mm.

10. The batch composition as claimed in claim 1, with a carbon content of 2 to 20% by weight.

* * * * *